(No Model.)
L. H. NASH.
PLUNGER PACKING FOR ENGINES.
No. 334,037. Patented Jan. 12, 1886.
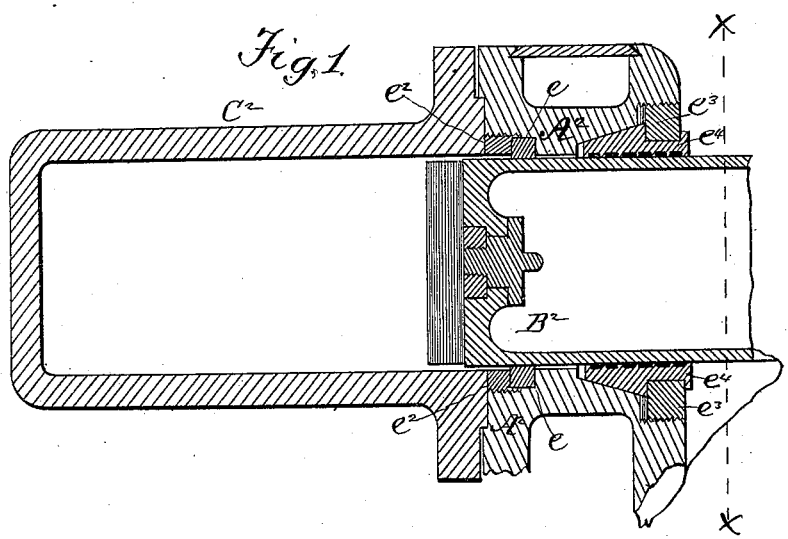
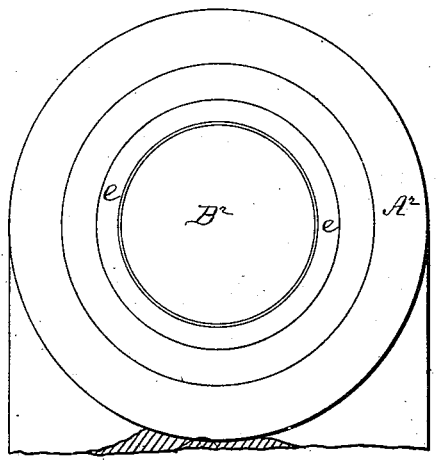
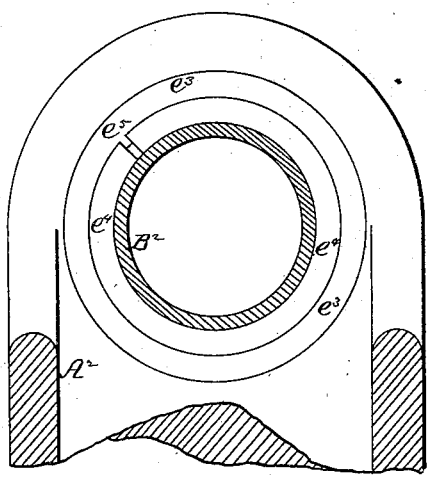
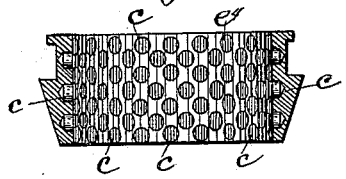
Witnesses:
O. E. Grant
M. F. Halleck
Inventor:
Lewis Hallock Nash
by Johnson and Johnson
Attys.

UNITED STATES PATENT OFFICE.

LEWIS HALLOCK NASH, OF BROOKLYN, ASSIGNOR TO THE NATIONAL METER COMPANY, OF NEW YORK, N. Y.

PLUNGER-PACKING FOR ENGINES.

SPECIFICATION forming part of Letters Patent No. 334,037, dated January 12, 1886.

Application filed June 3, 1885. Serial No. 167,480. (No model.)

*To all whom it may concern:*

Be it known that I, LEWIS HALLOCK NASH, a citizen of the United States, residing at Brooklyn, in the county of Kings and State of New York, have invented new and useful Improvements in Plunger-Packings for Engines, of which the following is a specification.

The object of my improvement is to provide a joint-forming packing for the plunger or piston of a gas-engine, requiring no lubrication by oil, and to maintain a gas-tight packing-joint for the piston.

The provision which dispenses with the necessity of lubricating the piston-packing by oil is important in a gas-engine, since oil dries and cakes under the intense heat produced by the combustion of the gases which form the motive power, and the packing-surfaces cannot maintain an effective joint-forming contact by reason of the hardening and caking of the oil.

I have represented in the drawings so much of a cylinder and piston of a gas-engine as illustrates the application of my improved joint-forming bearing and packing, in which—

Figure 1 is a central section showing the piston-cylinder bearing independent of the piston-packing ring. Fig. 2 is an end view, the cylinder cap being removed. Fig. 3 is a cross-section on the line $x$ $x$ of Fig. 1, and Fig. 4 shows a section of the lubricating-cylinder bearing-ring.

In the type of engine-cylinder shown the combustion-chamber is formed by a separate cylinder-cap, and the piston is such as is used in what is known as a "trunk-engine;" but my improvement is applicable to other constructions and kinds of engines.

In the illustration the piston-packing ring $e$ is placed in a recess in the wall of the cylinder $A^2$, at or near its junction with the cap $C^2$, which forms the combustion-chamber, and is secured in its seat by a screw-follower, $e^2$, for maintaining a gas-tight joint between the piston $B^2$ and the cylinder.

Any form and kind of packing may be used, and it may be placed in the piston or in plunger-walls. Independent of this piston-packing ring, and placed in the cylinder-walls, is a bearing-ring, $e^4$, having its inner bearing-wall upon the piston and its outer bearing-wall upon an inclined seat in the cylinder, so that this bearing-ring forms a truncated cone. It is secured in its seat at the open end of the cylinder by a screw-ring follower, $e^3$, whereby the bearing-ring is adjusted for taking up wear and forming a close joint with the piston. This bearing-ring is utilized as a lubricating device for the piston and for the packing-ring proper, and for this purpose its inner wall is filled with plugs $c$, of metalline, which has a lubricating function in a well-known manner. The lubricating function of this bearing-ring is extended to the packing-ring by means of the plunger, since the walls of the latter become thoroughly coated with the metalline throughout its length, so that the packing-ring bears upon this metalline coating in the operation of the piston, and is thereby itself coated and kept constantly lubricated from the plunger-walls.

I am aware that it has been proposed to use metalline in the packing-ring itself; but this has been found impracticable, for the reason that the joint forming the function of the packing-ring is thus destroyed; but by placing these two devices independent of each other each will perform its specific function—the packing-ring $e$ to form a gas-tight joint, and the metalline-faced ring to give a lubricating bearing to the plunger and to the packing-ring. The adjustment of the metalline bearing-ring, as stated, is made by the screw-follower $e^3$, and the former is split, as shown at $e^5$, Fig. 3, so as to allow it to be forced upon its inclined seat against the plunger-walls to make a close bearing. The independent relation of the packing and of the lubricating-rings affords a bearing for the trunk-plunger at the top and at the bottom of the cylinder, and renders the bearing-ring $e^4$ accessible for the use of oil, if desired. The screw-follower $e^3$ operates in a threaded recess in the lower open end of the cylinder and upon the shoulder of the bearing-ring to adjust the latter, when required, by moving it inward upon its inclined seat in the cylinder-walls, so as to close the split ring closely upon the plunger-walls.

I claim—

1. The combination, with a cylinder, a piston or plunger, and a packing-ring for the latter, of an adjustable ring-bearing seat for the plunger independent of the packing-ring, arranged at the open end of the cylinder, substantially as described, for the purpose specified.

2. The combination, with a piston or plunger and a cylinder having a packing-ring, of an independent bearing-ring, its inner wall containing metalline, and arranged to lubricate the walls of the plunger and the said packing-ring, substantially as set forth.

3. The combination, with the cylinder, the plunger, and the packing-ring therefor, of an independent lubricating bearing-ring, seated upon an inclined seat in the cylinder-walls, and an adjusting screw-ring fitted in said cylinder upon the said lubricating bearing-ring, substantially as described, for the purpose specified.

In testimony whereof I have hereunto set my hand in the presence of two subscribing witnesses.

LEWIS HALLOCK NASH.

Witnesses:
H. W. BRINCKERHOFF,
WILLIAM C. WESTERVELT.